July 5, 1966 G. E. BRUMFIELD ET AL 3,259,697

TELEPHONE SIGNALING SYSTEM

Filed Nov. 28, 1962 5 Sheets-Sheet 1

INVENTORS G. E. BRUMFIELD
C. E. MORSE
J. P. SMITH

E J Olinder
ATTORNEY

July 5, 1966 G. E. BRUMFIELD ET AL 3,259,697

TELEPHONE SIGNALING SYSTEM

Filed Nov. 28, 1962 5 Sheets-Sheet 2

United States Patent Office
3,259,697
Patented July 5, 1966

3,259,697
TELEPHONE SIGNALING SYSTEM

Grayson E. Brumfield, Freehold, and Charles E. Morse and John P. Smith, Holmdel, N.J., assignors to Bell Telephone Laboratories, Incorporated, New York, N.Y., a corporation of New York
Filed Nov. 28, 1962, Ser. No. 240,601
2 Claims. (Cl. 179—16)

This invention relates to telephone intercommunication systems, and more particularly to signaling arrangements which enable stations having pushbutton type multifrequency dials and stations having the presently more conventional rotary, or finger wheel, type dials to be used together in a single system.

Telephone intercommunication systems comprising station sets equipped with rotary, or finger wheel, type dials invariably include signaling arrangements which respond to trains of unidirectional dial pulses. Often the selector element of such signaling arrangements includes a relay operated stepping switch in which a train of dial pulses advances a rotatably mounted armature to an output terminal corresponding to the set being called. Signals to initiate ringing, lamp flashing, etc., which usually originate from a common source, are then conducted to the called set through the rotated armature of the stepping switch and the output terminal to which the armature has been advanced. When a called station answers, the armature is returned to its initial position in preparation for subsequent calls. One example of a telephone intercommunication system having a signaling arrangement operative in the manner described above is disclosed in U.S. Patent 2,833,457 issued to H. T. Carter and S. A. Kelnhofer on April 21, 1959.

With the introduction into telephone central offices of electronic switching systems, it has become practical to offer to subscribers pushbutton type multifrequency dialing. Although it is widely recognized that multifrequency dialing, i.e., the use of a combination of frequencies in a single burst to represent a dialed digit, offers the dual advantages of greater speed and ease of manual manipulation when contrasted with rotary dialing, the transition between the two has been gradual due to the relatively high cost of conversion. Often, multifrequency dialing facilities are offered to subscribers at a premium above the charge for a rotary dial type set. Consequently, it is not unusual for a single multistation customer to have only a minimum number of pushbutton type sets, say for the officers or higher officials if the customer is a business establishment, while the remainder of the sets, those for the lower level employees, are of the rotary dial type.

Unfortunately, signaling and switching equipment which is responsive to a train of unidirectional pulses such as generated by a rotary dial is usually not compatible with the type signaling and switching equipment required by multifrequency dials. The train of pulses which steps the armature of the rotary switch to the terminal position of the called station is not present in the digit-representing burst of a multifrequency dial. In the past, rotary and multifrequency dialing have been rendered mutually compatible in a single system by the provision of a converter circuit which recognizes a call for service by a multifrequency equipped station and transforms the multifrequency dialing bursts into series of unidirectional pulses similar to those emitted by a rotary dial. An example of one such converter is disclosed in U.S. Patent 3,133,155, issued to F. C. Kuchas May 12, 1964. Although converter circuits of the type disclosed by Kuchas are adequate from an operational standpoint, they are usually complex in construction, and hence costly, and in addition, conversion of dialing signals from a single multifrequency burst to a train of pulses tends to defeat the time conserving aspects of this type of dialing.

Accordingly, it is the primary object of this invention to simplify the equipment necessary to render multifrequency type dialing stations and rotary type dialing stations compatible with one another in a single telephone intercommunication system.

It is another object of the invention to permit dialing by multifrequency type stations to be completed only during a predetermined time interval, and to indicate the termination of this interval to the calling subscriber.

These and other objects of the invention are accomplished, broadly, by a simplified adapter circuit which recognizes a request for service by a multifrequency type station, detects bursts of multifrequency dialing signals from the station requesting service, and selectively energizes the output terminals of a pulse responsive stepping switch in accordance with the number being dialed. In the particular embodiment of the invention described herein, which is intended to be illustrative only and in no way restrictive, the stepping switch mentioned previously is the selector element for the rotary dial type stations and comprises an armature which is advanced over a group of digit-representing output terminals under the control of dial pulses; and the adapter circuit includes a frequency detector and a relay switching network which, by the operation of combinations of relays, selectively energize the output terminals of the stepping switch in accordance with the digits dialed by the multifrequency type stations.

One feature of the invention resides in a frequency detector and relay switching network combination which serves to energize one of a plurality of output terminals in accordance with the coding of multifrequency signal bursts applied to the input terminal of the detector.

Another feautre of the invention pertains to an arrangement for recognizing requests for service from certain ones, namely the multifrequency type stations, of a plurality of stations in a telephone system, and responsively conditions the aforementioned frequency detector and switching network for the reception of dialing signals.

Still another feature of the invention involves a timing circuit which inhibits further operation of the switching network after a fixed time interval subsequent to a request for service has expired, and transmits a tone indicative of this event to the calling subcriber.

These and other objects and features of this invention will be more thoroughly understood by reference to the following detailed description of an illustrative embodiment of the invention and the accompanying sheets of drawing of which:

Figures 1, 2:
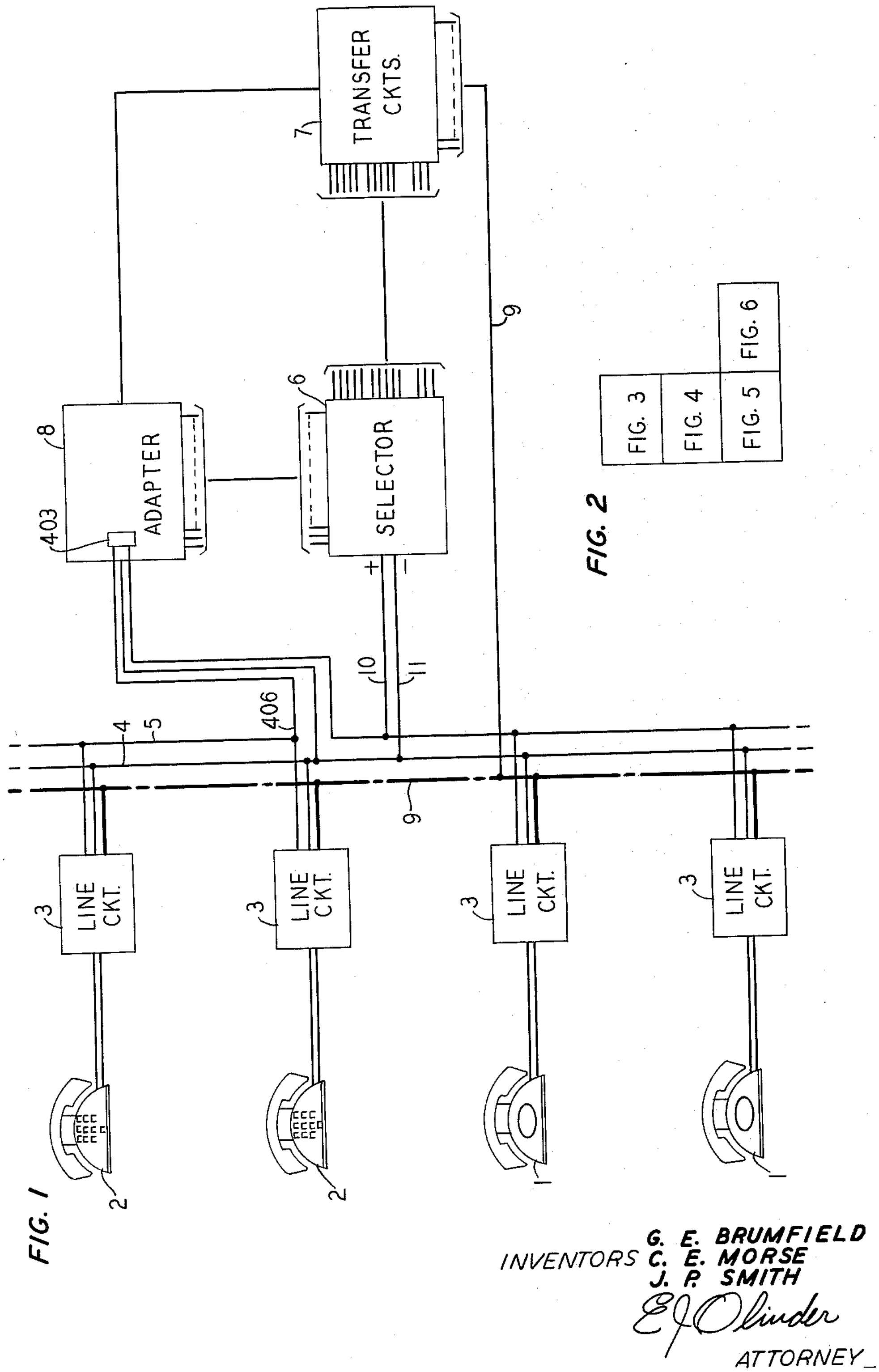
FIG. 1 is a functional block diagram of a telephone intercommunication system of the type in which the present invention finds particular utility.
FIG. 2 shows the manner in which the remaining sheets of drawings are arranged to form a detailed schematic diagram of one embodiment of the invention.

Before describing the specific circuitry of FIGS. 3 through 6 in detail, reference is first directed to the generalized system pictured in FIG. 1. As shown, the system comprises two distinct types of telephone sets disposed in separate groups. The sets of the lower group, designated 1, are equipped with rotary, or finger wheel, type dials which effect signaling by interrupting the flow of direct current in a signaling link repeatedly in numerical correspondence with the particular digit dialed. The sets of the upper group, designated 2, are equipped with pushbutton type multifrequency dials which generate dialing information in the form of frequency coded pulses, that is to say, each dialed digit is represented by a unique combination of frequencies generated simultaneously in a single burst, or envelope. In the embodiment of the invention disclosed herein it is contemplated that each dialed digit consists of a pair of individual frequencies selected from a group of seven. One example of a telephone circuit having a multifrequency dial capable of performing in the manner described above is disclosed in U.S. Patent 3,064,084, issued to L. A. Meacham, November 13, 1962.

Each station, whether of the rotary dial or of the multifrequency type, is connected by a separate line circuit 3 to a common talking link for the system comprising conductors 4 and 5. Line circuits such as 3 which serve both to couple a station to a talking link and to transfer ringing signals from a common system signaling generator to a selected one of the stations are well known in the telephone art, and a specific example of one such circuit is disclosed in the aforementioned Carter-Kelnhofer patent.

Bridged across conductors 4 and 5 of the talking link is a selector 6 which includes a ringing generator for energizing the ringer of any selected set. Selector 6, as will be explained in detail below, includes a rotary type stepping switch which operates in response to pulse trains emitted by the rotary dials of sets 1, and applies ringing signals from the aforementioned ringing generator through a group of transfer circuits 7, a selected conductor in signaling cable 9 and the appropriate line circuit 3 to the particular set, either rotary or multifrequency type, being called. Also connected across the conductors of the talking link is an adapter 8 which includes frequency detection circuitry responsive to the combinations of dialing tones emitted by the multifrequency dials of stations 2. In function, adapter 8 is somewhat similar to selector 6 in that it transfers ringing signals from the aforementioned ringing generator in the selector to transfer circuits 7, from which these signals are applied to the ringer of the called set in the same manner as if the calling set were of the rotary dial type.

The different types of sets are shown connected through their respective line circuits 3 to the talking link in separate groups, the rotary dial sets being connected to the lower end of the link while the multifrequency sets are connected to the upper end. Disposed both in series with and intermediate the connections of the different groups to conductor 5, is the winding of relay 403 which is shown incorporated in adapter 8. As will be explained in greater detail below, relay 403 recognizes requests for service by the multifrequency sets and conditions adapter 8 to receive subsequent dialing information. When the handset of one of the multifrequency type sets is lifted, thereby rendering that set "off-hook," a conduction path connecting the conductors of the talking link is established in a conventional manner through the speech circuit of the off-hook set and the associated line circuit 3.

Conductors 10 and 11, which couple dialing signals from the talking link to selector 6, also serve to apply to the talking link a unidirectional voltage with the indicated polarity. Consequently, when a multifrequency station is placed in the off-hook condition, current commences to flow in the above-described conduction path, thereby energizing relay 403 and conditioning adapter 8 for the reception of multifrequency dialing signals. It will be observed that since the point at which the unidirectional voltage is applied to the talking link is electrically intermediate the winding of relay 403 and the group of rotary dial sets, placing a set of the latter type in the off-hook condition does not result in the energization of relay 403.

It is to be understood that the arrangement illustrated in FIG. 1 is merely a basic embodiment of the invention to which numerous and varied features may be added without departing from the spirit and scope of the invention.

With reference now to FIGS. 3 through 6 of the drawing, oriented as shown in FIG. 2, a detailed description of a specific embodiment of the invention will now be presented.

*Selection by rotary dialing*

When the handset of a rotary dial set is removed from its cradle, preparatory to dialing, relay 500 (FIG. 5) is operated through a path comprising negative source of potential, the lower winding of relay 500, conductor 5 of the talking link, line circuit 3 and the speech circuit of the off-hook station, conductor 4, the upper winding of relay 500 and ground. Immediately thereafter, relay 501 is operated through an obvious path including armature 1 of relay 500. As designated, relay 501 is of the slow release type, that is to say, it remains operated for a short period of time after its energizing path is interrupted. When the calling subscriber dials the first digit of the code representing the set being called, the undirectional current flowing through the calling set, and consequently the current energizing relay 500 is rapidly interrupted a number of times corresponding to the dialed digit. Relay 500 is released and reoperated concurrently with these interruptions, but since relay 501 is slow release, it remains continuously operated. Accordingly, relay 504 is pulsed by the calling subscriber's dial through a path comprising negative source of potential, the winding of relay 504, conductor 506, the armature 2 of relay 501, pulsating armature 2 of relay 500 and ground.

Figure 5:
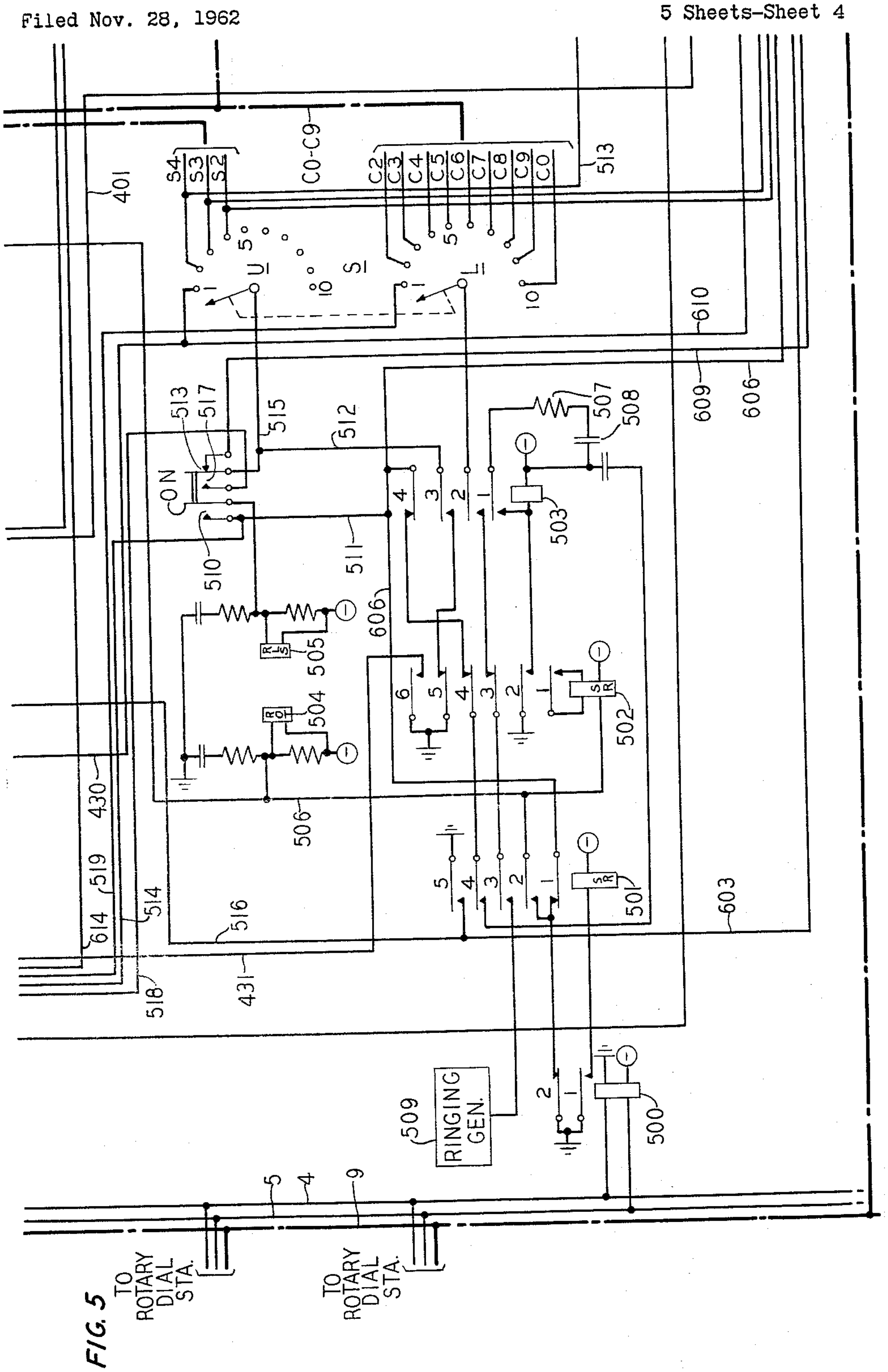
FIG. 5 illustrates a selector circuit which operates in response to conventional dial pulses from a rotary dial type station to establish a signaling path from a calling to a called station.

Included in the selector of FIG. 5 is a multiple bank rotary type stepping switch S having an upper bank U and a lower bank L. Each bank has a rotating armature which is stepped along an array of output terminals successively numbered 1 through 10, each corresponding to a different possible dialed digit. Mechanically, the armatures are coupled to a single shaft which is rotated incrementally by a conventional pawl and ratchet mechanism (not shown) under the control of relay 504. Also associated with stepping switch S is an off-normal switch ON which resides in the position shown when the stepping switch is in an unoperated position, but is shifted to the left when the stepping switch is operated; and a release relay 505 which when operated disengages the aforementioned pawl from its ratchet and returns the armatures of the stepping switch back to the unoperated position.

In systems comprising a maximum of nine telephone sets, any set in the system may be selected by dialing a single digit (2 through 0), and applying ringing voltage directly from the output terminals of the stepping switch to the called set. However, when a system includes greater than nine sets, a number of transfer circuits, such as the three shown in FIG. 6, must be added. Of the three transfer circuits shown in FIG. 6, the first is for sets having calling codes from 20 to 29, the second for sets having calling codes from 30 to 39, and the third for sets having calling codes from 40 to 49. It will become apparent as the description proceeds that the first digit of a two digit code cannot be assigned to a set as a single digit code. Consequently, in the system described herein which includes three transfer circuits, only stations 5 through 0 may be assigned single digit codes.

When a calling subscriber desires to ring a set having a single digit code, for example the station having the assigned code eight, he dials the digit 8 and in response, relay 500 is released and reoperated eight times in rapid succession. Concurrently, eight pulses are applied to relay 504 through armature 2 of relay 500, armature 2 of relay 501 and conductor 506. The operation of relay 504 advances the armatures of both the upper and lower banks of stepping switch S to their respective eighth output terminal positions. As shown, the eighth terminal position of the upper bank is vacant, but the eighth position of the lower bank connects through armature 8 of relay 600 of the first transfer circuit, and similarly through the armatures 8 of the second and third transfer circuits, which are identical in construction to the first transfer circuit, to output terminal C8 of the third transfer circuit.

Upon the first release of relay 500, slow release type relay 502 is operated through a path comprising negative source of potential, the lower winding of relay 502, armature 2 of relay 501 and armature 2 of relay 500. Operation of relay 502 results in the energization of relay 503 through an obvious path comprising the armature 2 of 502 and ground. Accordingly, a conduction path is established from ground through armature 2 of relay 502, armature 1 of relay 503 and resistor 507 for charging the capacitor 508 from negative potential during dialing. Shortly after dialing subsides relay 502 releases, but relays 500 and 501 remain operated. Consequently, 20 cycle ringing voltage from ringing generator 509 is applied through armature 3 of relay 501, armature 3 of relay 502, armature 2 of relay 503, the lower armature 2 of relay 503, the lower armature and eighth output terminal of stepping switch S, conductor C8, the eighth armatures of relays 600 in the first, second and third transfer circuits and signaling cable 9, to energize the ringer of the called set.

When relay 502 releases, thereby removing ground from the winding of relay 503, capacitor 508 commences discharging through resistor 507 and armature 1 and the winding of relay 503. Consequently, relay 503 remains energized, and hence ringing is sustained, for a time interval determined by the impedance of resistor 507 and the reactance of capacitor 508. After capacitor 508 has discharged sufficiently, relay 503 releases, thereby establishing a conduction path to ground for releasing relay 505 through contacts 510 of off-normal switch ON, armatures 4 of relays 503, 502, and 501, and armature 1 of relay 500. As a result, the armatures of the upper and lower banks of stepping switch S are returned to their initial positions in preparation for subsequent calls.

Assume it is desired to call a set having a two digit code, for example the code 28. Upon the digit 2 being dialed, the armatures of stepping switch S are advanced to output terminal positions 2 in the manner described above, and relays 502 and 503 are operated. As a result, relay 601 of the first transfer circuit is operated through a path comprising ground, the armature 5 of relay 502, armature 3 of relay 503, conductor 512, the armature and second terminal position of the upper bank of stepping switch S, conductor 513, the winding and armature of relay 601, conductor 602, serially disposed armatures 1 of relays 600 of all transfer circuits and negative source of potential. Relay 601 locks up over a path comprising negative source of potential, armature 3, the winding and armature 5 of relay 601, conductor 603, armature 5 of relay 501 and ground. When relay 601 operates, the ground on conductor 603 is applied through armature 6 of relay 601, conductor 604, armature 3 of relay 600, diode 605, conductor 606, conductor 511, and closed contacts 510 of off-normal switch ON,, thereby causing relay 505 to operate and return the armatures of the stepping switch to their initial position in preparation for reception of the second digit. After off-normal switch ON has been returned to the position shown in the drawing, relay 600 of the first transfer circuit is operated through a path comprising negative source of potential, the winding of relay 600, conductor 607, armature 5 of operated relay 601, conductors 608 and 609, contacts 513 of off-normal switch ON, conductor 512, armature 3 of relay 503, armature 5 of relay 502 and ground. Relay 600 locks over a path comprising negative source of potential, the winding and armature 2 of relay 600, conductor 604, armature 6 of relay 601 and the aforementioned ground on conductor 603.

When the second digit, eight, of the calling code is dialed, the armatures of the stepping switch are advanced to their eighth output terminal position in the same manner as previously described. No response is initiated via the upper bank of the switch since the output terminal corresponding to position 8 is vacant. At the lower bank, however, ringing voltage is applied from ringing generator 509, through armatures 3 of relays 501 and 502, armature 2 of relay 503, the lower armature and eighth output terminal position of the stepping switch, conductor C8, armature 9 of relay 600 of the first transfer circuit, conductor C28 and signaling cable 9 to the ringer of the called set.

Shortly after the second digit has been dialed, relay 502 releases, ground being removed from its lower winding by the release of armature 2 of relay 500. Consequently, ground is also removed from the winding of relay 503 and, as previously explained, capacitor 508 begins its timed discharge through a resistor 507, maintaining relay 503 operated for a predetermined interval. When relay 503 releases, relay 505 is operated to return the armatures of stepping switch S to their initial position and ringing voltage is removed from the called station. Relays 600 and 601 remain operated until all parties to the call return their sets to the on-hook condition. At that time, relays 500, and 501 shortly thereafter, release, and ground, formerly applied through armature 5 of relay 501, is removed from conductor 603 to break up the operating path of relays 600 and 601. The system is now fully released and prepared to handle subsequent calls.

As shown in the drawing, the selector of FIG. 5 is constructed to release and return to its original condition if the initial digit dialed is "1." Such an arrangement is provided to prevent a false registration in stepping switch S of a digit 1 which may be caused by the calling subscriber fumbling or dropping his handset when first lifting it from the cradle. When the digit 1 is registered initially in stepping switch S and the armature of the upper bank has advanced to its first terminal position, an operating path is established for releasing relay 505 comprising a negative source of potential, the winding of relay 505, now closed contacts 510 of off-normal switch ON, conductor 514, armature 3 of relay 400, conductor 401, serially connected armatures 1 of relays 601 of all transfer circuits, conductor 610, the first output terminal and armature of the upper bank of stepping switch S, conductors 515 and 512, armature 3 of relay 503, armature 5 of relay 502 and ground. Accordingly, relay 505 operates and returns selector switch S to its original unoperated position, and in so doing breaks the operating path for relay 505. It will be observed that the stepping switch will not be released through the path just described if the second digit dialed is 1, because in such an event relay 601 of one of the transfer circuits is operated, thereby opening the path through armature 1 of that relay.

*Selection by multifrequency dialing*

Figure 3:
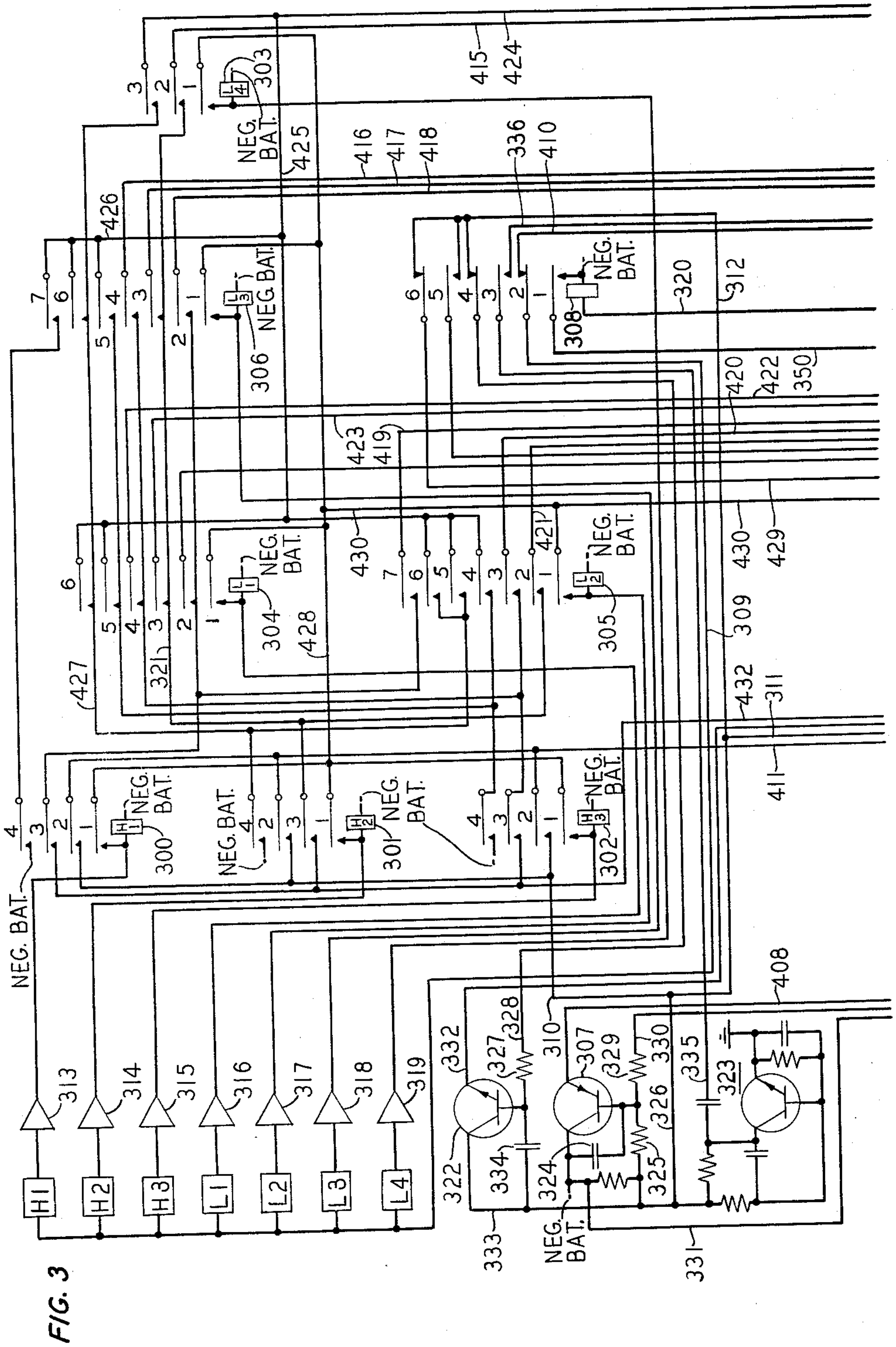
FIGS. 3 and 4 show in detail an adapter circuit which detects bursts of multifrequency dialing signals and selectively energizes one of a plurality of output terminals in accordance with the frequency coding of the bursts.
Figure 4:
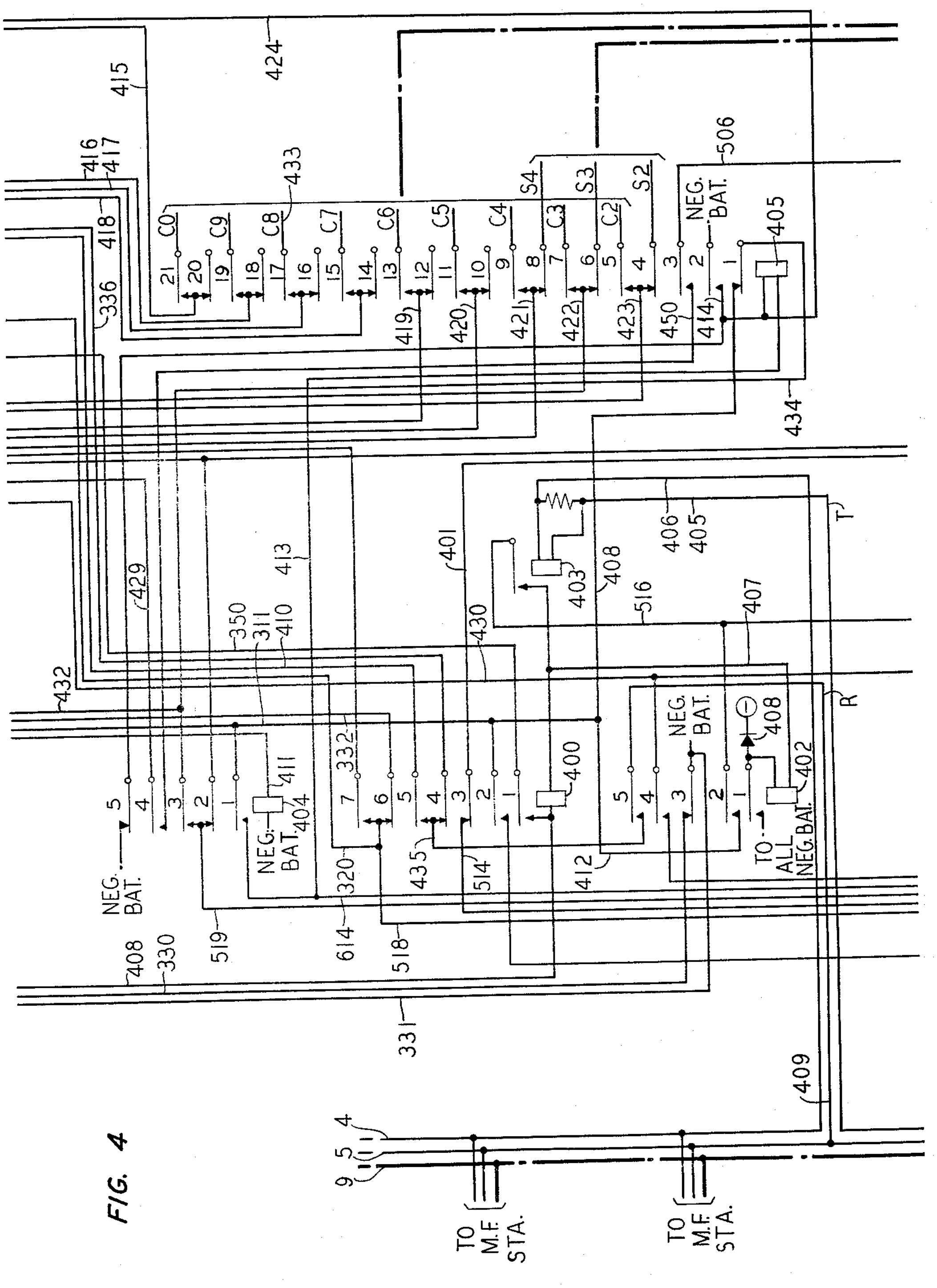

Illustrated in FIGS. 3 and 4 is a detailed schematic diagram of an adapter circuit which recognizes multifrequency coded digits and establishes a conduction path for applying ringing voltage from ringing generator 509 to the various output terminals of stepping switch S. In this manner, ringing is allowed to proceed as if the armatures of the stepping switch were advanced to the output terminals corresponding to the called set by pulses from a rotary dial.

As shown in FIG. 3, the adapter circuit includes a frequency detector arrangement comprising a bank of conventional bandpass filters individually tuned, as labeled, to frequencies H1 through H3 and L1 through L4. As referred to hereinafter, these frequencies shall be understood to correspond to the various frequencies emitted by the multifrequency dials, each of the dialed digits comprising one of the "H" frequencies and one of the "L" frequencies generated in a simultaneous burst. By way of example, the table below lists one possible grouping in which the digits may be encoded.

| Digit: | Frequency code |
|---|---|
| 1 | H1, L1 |
| 2 | H2, L1 |
| 3 | H3, L1 |
| 4 | H1, L2 |
| 5 | H2, L2 |
| 6 | H3, L2 |
| 7 | H1, L3 |
| 8 | H2, L3 |
| 9 | H3, L3 |
| 0 | H2, L4 |

Associated with the frequency detector is a corresponding group of relays 300 through 306, each of which, as is labeled, is operated through a different one of the filters. Relays 300 through 306, when operated in the various combinations determined by which digit is dialed, provide signaling paths through which ringing voltage is applied from ringing generator 509, through the adapter circuit and to the output terminals of the stepping switch S corresponding to be called set.

The final connector element in the adapter circuit through which ringing voltage is coupled to the stepping switch S is relay 405. Relay 405 includes two mutually exclusive groups of armatures, an even-numbered group comprising armatures 4 through 20 which couple ringing voltage to the output terminals of the upper bank U of the stepping switch, and an odd-numbered group comprising armatures 5 through 21 which couple ringing voltage to the lower bank L.

Ringing voltage circulated through the adapter is applied to the aforementioned armatures of relay 405 by conductors 415 through 423. As shown, each of these conductors is capable of applying its ringing voltage to an output terminal of either the upper bank of the stepping switch or an output terminal of the lower bank depending upon whether or not relay 405 is operated. With relay 405 unoperated, the condition shown in the drawing, ringing voltage is applied to the even-numbered armatures and thence to the respective terminals of the upper bank. With relay 405 operated, that is to say with the armatures pulled down, ringing voltage is applied to the odd-numbered armatures and thence to the respective output terminals of the lower bank.

Figure 6:
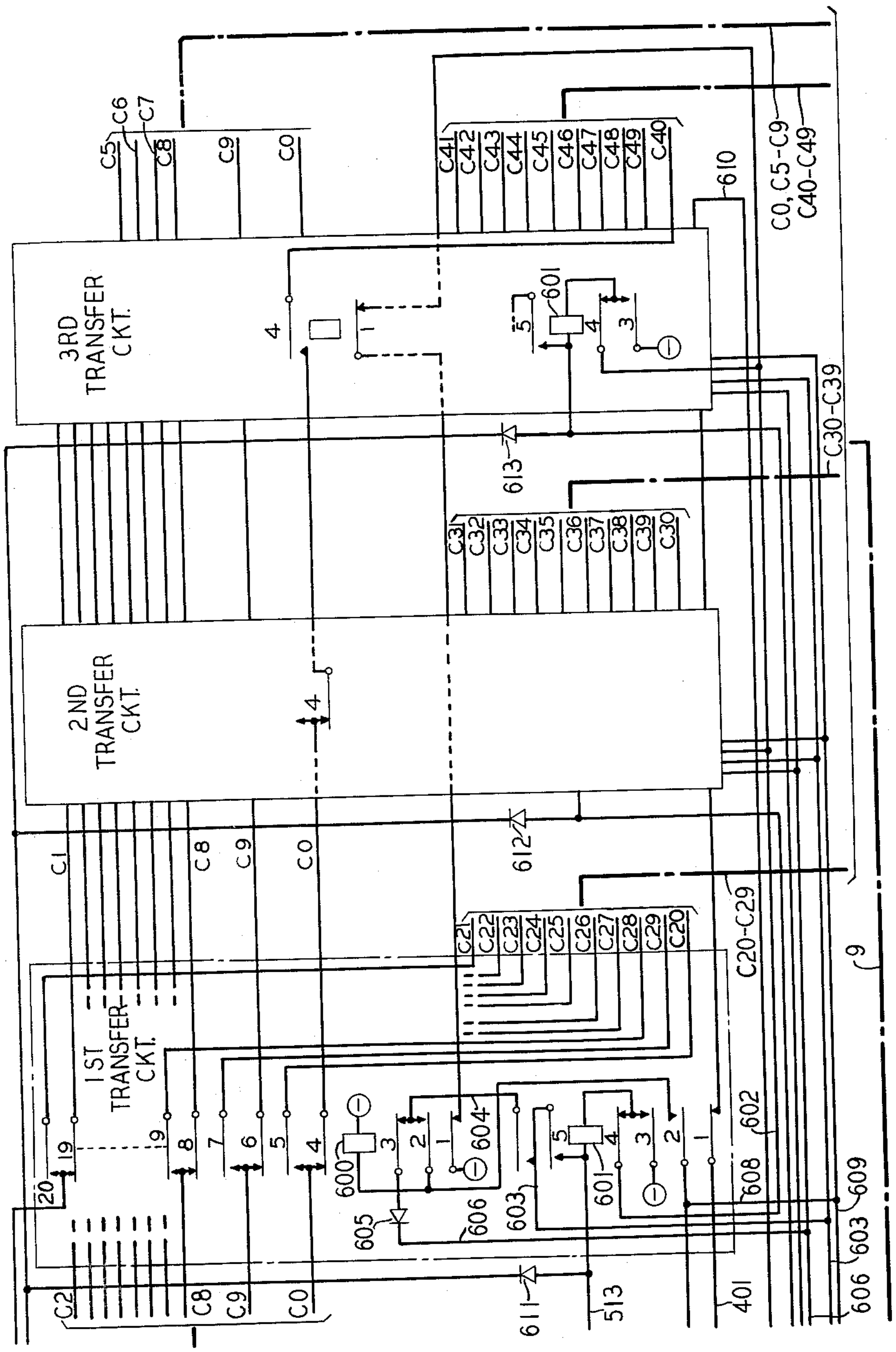
FIG. 6 shows several transfer circuits which permit signaling to be accomplished on a multiple digit as well as a single digit basis.

It will be recalled from the previous discussion of rotary dial operation that the output terminals of the upper bank serve to activate the various transfer circuits of FIG. 6 when a two digit code is dialed, while the output terminals of the lower bank serve to apply ringing voltage to the particular set called. Consequently, when a single digit code is dialed, relay 405 is operated immediately so as to permit the application of ringing voltage to the particular output terminal of the lower bank of stepping switch S which corresponds to the called set. Conversely, when a two digit code is dialed, relay 405 is not operated upon the occurrence of the first digit, this digit serving to apply a signal through the even-numbered armatures to activate the appropriate transfer circuit of FIG. 6, but is operated upon the occurrence of the second digit so that ringing voltage may then be applied to the appropriate output terminal of the lower bank of stepping switch S and thence through the activated transfer circuit to the called set.

In the embodiment of the invention described herein, provision is made for incorporating sets into the system having two digit calling codes of which the first digits comprise the numerals 2, 3 and 4. Accordingly, these numerals, that is 2, 3 and 4, cannot be assigned as single digit codes, but all other numerals, that is 5 through 0, may be so assigned. Thus, when any of the digits 5 through 0 appear as initial digits, relay 504 must be operated so that ringing voltage may be applied at that time to the lower bank output terminals of the stepping switch. Conversely, if one of the digits 2, 3 or 4 appears as an initial digit, relay 405 must remain unoperated so that a signal may be applied to the upper bank of stepping switch S in preparation for the second digit.

When a subscriber desiring to originate a call from a multifrequency type set lifts his handset from its cradle, a conduction path is established between conductors 4 and 5 of the talking link via the speech circuit and line circuit 3 of the off-hook set. Accordingly, an operating path for relay 403 is established comprising ground, the upper winding of relay 500, the lower portion of conductor 4 of the talking link, conductor 405, the winding of relay 403, conductor 406, the upper portion of conductor 4, the line circuit 3 and speech circuit of the off-hook set, conductor 5 of the talking link, the lower winding of relay 500 and negative source of potential. Consequently, relays 403, 500 and 501 are energized conditioning the adapter for operation.

Operation of relays 403 and 501 result in an operating path being established for relay 402 via ground, armature 5 of relay 501, conductor 516, the single armature of relay 403, conductor 407, the winding of relay 402, diode 408 and negative source of potential. The aforementioned source of potential advantageously constitutes the negative supply for the equipment of FIGS. 3 and 4, and, as indicated is applied through armature 1 of relay 402 to all points in the circuit requiring negative battery. Operation of relay 403 also causes transistor 307 to conduct by applying the ground on conductor 516 through the contact of relay 403, the winding of relay 400 and conductor 408 to the emitter of that transistor. When transistor 307 begins to conduct, relay 400 operates. All of the foregoing occur before dialing is commenced.

If the calling subscriber desires to ring a set having a single digit code, for example the digit 8 he depresses the digit-8 plunger of his dial and, as seen from the above table, frequencies H2 and L3 are applied to the talking link in a single burst. This pair of frequencies is applied by conductor 409, armature 5 of relays 402 and 400, conductor 410, armature 2 of relay 308 and conductor 309 to each filter of the frequency detector. As a result, signals are translated through the appropriate pair of filters, H2 and L3 in the example given, and the corresponding amplifiers 314 and 318 to operate relays 301 and 306. Although not specifically shown, amplifiers 313 through 319 may in actuality be transistor gating circuits which are rendered conducting by signals translated through the filters and apply ground to the windings of the respective relays to which they are connected.

The operating of any "H" relay, the H2 relay in this example, completes an operating path for relay 404 comprising negative battery, the winding of relay 404, conductor 411, armature 2 of whichever "H" relay is operated, conductors 310, 311 and 412, armature 2 of relay 402 and ground which, as aforementioned, appears on conductor 516. When relay 404 operates, ground is applied to the lower terminal of the winding of relay 405 through conductor 413, the 1 armature of relay 404, conductors 311 and 412, and armature 2 of relay 402. Since the number being dialed comprises a single digit code, relay 405 must be operated on the appearance of the first digit and consequently, negative battery is applied concurrently to the upper winding of this relay through conductors 424, 425 and 426, armature 6 of relay 306, conductor 427 and armature 4 of relay 301. Thus, relay 405 operates and is locked up through a path comprising negative battery, armature 2 and the winding of relay 405, conductor 413, armature 1 of relay 404, conductors 311 and 412, armature 2 of relay 402 and the ground on conductor 516.

The operation of relay 405 causes relays 502 and 504 to be operated through paths comprising negative source of potential, the windings of relays 502 and 504, conductor 506, armature 3 of relay 405, conductor 450, armature 4 of relay 404, conductor 429, armature 6 of relay 308, conductors 312, 311, and 412, armature 2 of relay 402 and the ground on conductor 516. Upon relay 504 operating, the armatures of stepping switch S are advanced to the first output terminal position. Since relay 400 is now operated, thereby disconnecting armature 3 of that relay from its associated contacts, the path is broken for operating release relay 505 in the event of an initial digit 1 being dialed. Consequently, the armatures of the stepping switch remain in the first terminal position for the remainder of the dialing. The advancement of the armature of the upper bank of the stepping switch to the first terminal position establishes a locking path for the operated "H and L" relays comprising armature 1 of the operated H and L relays, conductors 428 and 430, armature 4 of relay 402, conductor 431 and armature 6 of relay 502. As previously noted, when relay 502 operates, relay 503 is also operated.

The advancement of the armature of the upper bank of stepping switch S to the first terminal position completes a path for operating relay 308 comprising negative battery, the winding of relay 308, conductors 320 and 518, contacts 517 of off-normal switch ON, conductor 515, the armature and first output terminal of the upper bank of stepping switch S, conductor 430, armature 4 of relay 402, conductor 431 and armature 6 of relay 502. When relay 308 operates, relay 502 is released due to armature 6 of relay 308 being separated from its associated contact, but the H and L relays, which were formerly locked up by armature 6 of operated relay 502, remain energized nevertheless through a path comprising armature 1 of the operated H and L relays, conductors 428 and 430, the first output terminal and armature of the upper bank of stepping switch S, conductors 515 and 512, armature 3 of relay 503 and armature 5 of the now released relay 502.

As was the case with rotary dialing, after relay 502 releases, relay 503 remains operated for a suitable ringing interval which is dependent upon the relative impedance values of capacitor 508 and resistor 507. During this interval, a signal from ringing generator 509 is circulating through the adapter via a path comprising armatures 3 of relays 501 and 502, armature 2 of relay 503, the armature and first output terminal of the lower bank of stepping switch S, conductor 519, armature 3 of relay 404, conductor 432, armature 3 of relay 301, conductor 321, armature 3 of relay 306, conductor 417 and armature 17 of relay 405. It should be obvious to one skilled in the art that similar paths through the adapter are likewise established when digits other than eight are dialed, the principal differences between the various paths being that the armatures of different "H" and "L" relays are traversed, and ringing voltage emerges from a different armature of relay 405.

From armature 17 of relay 405 ringing voltage is applied via conductor 433 to the eight output terminal of the lower bank of stepping switch S, and thence, in the same manner as if the calling set was equipped with a rotary dial, through the transfer circuits of FIG. 6 and signaling cable 9 to the ringer of the called set, in the example given to the set having calling code 8. When capacitor 508 has discharged, relay 503 releases. Consequently, ringing generator 509 is decoupled from the adapter circuit and the "H" and "L" relays, and relay 308, which were locked up through armature 3 of relay 503, are released.

When the parties to the conversation hang up, the conduction paths for operating relays 403 and 509 are broken. Consequently, these relays, and also relays 501 and 402, are released. The release of relay 501 when relays 502 and 503 are unoperated results in the operation of relay 505 through a path comprising negative source of potential, the winding of relay 505, contacts 510 of off-normal switch ON, conductor 511 and conductor 606, armature 1 of relay 501, armature 2 of relay 500 and ground. Consequently, the armatures of stepping switch S are returned to their initial position, thereby shifting off-normal switch ON to the position shown in the drawing and at the same time deenergizing relay 505. In addition, the release of relay 403 opens the operating path for relay 402, and thus negative battery is removed from all other relays in the adapter. This completes one cycle of adapter circuit operation for single digit dialing.

If the calling subscriber desires to dial a two-digit code, for example the code 28, relays 400, 402, 403, 500 and 501 are all operated, as previously described, before dialing commences. When the digit 2 is dialed, frequencies H2 and L1 are applied to the talking link by the multifrequency dial of the calling set. This burst of frequencies is detected by the conductor 409, respectively translated through filters H2 and L1, and energized relays 301 and 304. Also the operation of relay 301 results in relay 404 being operated. As contrasted to single digit dialing, however, no path is provided at this time through the energized H2 and L1 relays for operating relay 405. Consequently, the armatures of stepping switch S are not advanced to the first voltage terminal position, relay 502 is not operated, and no locking path is provided for maintaining relays 301 and 304 operated after the dialing frequencies have subsided. Consequently, the ground potential appearing on conductor 516 is applied to the second output terminal of the upper bank of stepping switch S through a path comprising armature 2 of relay 402, conductors 412 and 408, armature 1 of relay 405, conductors 434 and 432, armature 3 of relay 301, conductor 321, armature 3 of relay 304, conductor 423 and armature 4 of relay 405. From the second output terminal of the upper bank this ground is applied to conductor 513, thereby operating relays 601 and 600 which are then locked up as in the case of rotary dialing.

When the digit-2 burst of frequencies subsides the operated relays 301 and 304, and consequently relay 404, releases, but ground potential is nevertheless maintained on conductor 513 through armature 5 of relay 501, conductor 603, and armature 5 of relay 601. As a result, relay 405 is now operated owing to ground being applied to the lower terminal of its winding through conductors 413 and 614, and diode 611, and negative battery is applied to the upper terminal of its winding via conductor 414 and armature 5 of relay 404. Diodes 612 and 613 are poled in a direction to prevent the ground potential on conductor 614 from operating relays 600 and 601 of the second and third transfer circuits, respectively.

When the second digit is dialed, that is the digit eight, frequencies H2 and L3 are applied by conductor 409 through the bank of filters comprising the frequency detector and operate relays 301 and 306. Thereafter, relay 404 operates through armature 2 of the relay 301 causing relays 502 and 504 to be energized through conductor 506, armature 3 of relay 405, conductor 450, armature 4 of relay 404, conductor 429, armature 6 of relay 308, conductors 312, 311 and 412, armature 2 of relay 402 and the ground on conductor 516. As previously explained, when relay 502 operates, relay 503 is also operated. As a result, the armatures of stepping switch S are advanced to the first output terminal and the operated relays 301 and 306 are locked through conductor 430, armature 4 of relay 402, conductor 431, and armature 6 of relay 502. When the armature of the upper bank is stepped to its first output terminal, relay 308 is operated through conductors 320 and 518, contacts 517 of off-normal switch ON, the armature and first output terminal of the upper bank of stepping switch S, conductor 430, armature 4 of relay 402, conductor 431 and armature 6 of relay 502. The operation of relay 308 breaks the operating path for relay 502 formerly maintained through armature 6 of relay 308. Since relay 503 is operated at this time relays 301 and 306 remain locked nevertheless through conductor 430, the first output terminal and armature of the upper bank of stepping switch S, conductors 515 and 512, armature 3 of relay 503 and armature 5 of relay 502.

When relay 502 releases, ringing voltage from ringing generator 509 is circulated through the adapter circuit and applied to the eighth output terminal of the lower bank of the stepping switch through exactly the same path as when digit 8 was dialed as a single digit code. From the eighth output terminal this ringing voltage is applied through conductor C8 and armature 9 of relay 600 of the first transfer circuit to output terminal C28 which is connected through signaling cable 9 and the appropriate line circuit 3 to the ringer of the called set. When capacitor 508 has discharged, thereby effecting the release of relay 503, ringing generator 509 is decoupled from the adapter circuit and consequently ringing ceases. Thereafter, when all parties to the conversation hang up, all operated relays are released and the stepping switch is returned to its unoperated position in the same manner as when a single digit code was dialed. In addition, the ground potential on conductor 603 which formerly maintained relays 601 and 600 operated, is removed owing to the release of relay 501. This completes one cycle of two-digit multifrequency dialing.

*Time-out*

Included in the adapter is a circuit arrangement for preventing the completion of multifrequency dialing after the expiration of a predetermined time interval and for notifying the calling subscriber at that time to reinitiate the call. The timing element of this circuit arrangement comprises a capacitor 324 having one terminal connected directly to negative battery and the other terminal connected to the ground on conductor 516 through resistor 325, conductors 326, 310, 311 and 412, and armature 2 of relay 402. As shown, capacitor 324 is bridged across the collector and base terminals of transistor 307. A discharge path for capacitor 324 comprises resistor 329, conductor 330, armature 3 of relay 402 and conductor 331.

Also included in the aforementioned circuit arrangement is an interrupter comprising transistor 322. As shown, the emitter of transistor 322 is connected to negative battery through conductor 332, armature 6 of relay 400, conductor 320 and the winding of relay 308, and the base is connected to the ground on conductor 516 via resistor 327, conductor 328, armature 4 of relay 308, conductors 312, 311 and 412, and armature 2 of relay 402. The collector of transistor 322 is connected to the ground on conductor 326 by conductor 333. After the predetermined dialing period has expired, an oscillator 323 applies an audible tone to the talking link interrupted at a rate determined by the parameters of transistor 322 and capacitor 334.

In operation, the predetermined time interval is commenced by the operation of relay 402. This event applies negative potential to one terminal of capacitor 324, which then begins to charge from the ground on conductor 516, through armature 2 of relay 402, conductors 412, 311, 310 and 326, and resistor 325. It will be recalled that during this time, that is to say, while capacitor 324 is charging, transistor 307 is conducting, maintaining relay 400 operated. As capacitor 324 continues to charge, the potential at the base of transistor 307 approaches ground, and after a period of time (the aforementioned predetermined interval) which depends on the relative values of capacitor 324 and resistor 325, transistor 307 ceases to conduct. Hence, relay 400 is released thereby preventing further dialing frequencies to be transferred from conductor 409 to the frequency detector.

The release of relay 400 provides an operating path for relay 308 comprising negative battery, the winding of relay 308, conductor 320, armature 6 of relay 400, conductor 332, the emitter-to-collector path of transistor 322, conductor 333, and the ground on conductor 326. As a result of the negative potential at the winding of relay 308 being applied to the emitter of transistor 322, charging current for capacitor 334 begins to flow through the base-to-emitter path of transistor 322. When relay 308 operates, audible tones generated by oscillator 323 is applied via conductor 335, armature 3 of relay 308, conductor 336, armature 4 of relay 400, conductor 435 and armature 5 of relay 402 to conductor 409, and thence to the set of the calling subscriber to indicate the dialing interval has expired.

After a short period of time capacitor 334 charges sufficiently to cut-off transistor 322, thereby interrupting the operating path for relay 308. When relay 308 releases, the tone from oscillator 323 is decoupled from the talking link and capacitor 334 begins to discharge through resistor 327, conductor 328, armature 4 of relay 308, conductors 312, 311 and 412, and armature 2 of relay 402 to the ground on conductor 516. After capacitor 334 has discharged sufficiently to permit transistor 322 to once again conduct, relay 308 is reoperated and tone once again applied to the talking link. This sequence of operation continues so long as any sets on the talking link remain off-hook. Thus, an interrupted tone is heard in the receiver of the calling subscriber notifying him to hang up and commence dialing once again. If dialing is completed during the predetermined interval, the interrupted tone is prevented from being applied to the talking link. It will be recalled that upon the completion of the last dialed digit, whether than digit be the only digit of a single digit code or the second digit of a two digit code, relay 308 is operated. As a result, a locking path for relay 400 is established comprising negative battery, armature 1 of relay 308, conductor 350, armature 1 and the winding of relay 400, the armature of relay 403 and the ground on conductor 516. Accordingly, relay 400 is prevented from releasing even though transistor 307 has been cut-off by capacitor 324. Accordingly, tone from oscillator 323 is prevented from reaching the talking link since armature 4 of relay 400 is separated from its associated contact.

Although only a single embodiment of the invention has been described herein, it should be evident to one skilled in the art that numerous adaptations and variations to the system described herein may be designed without departing from the spirit and scope of the invention.

What is claimed is:

1. In a telephone intercommunication system, in combination, a first group of telephone sets each including means for generating unidirectional pulses corresponding to a dialed digit, a second group of telephone sets each including means for generating multifrequency pulses corresponding to a dialed digit, a source of ringing current, a multifunction stepping switch having an armature and a plurality of output terminals in cooperative relation therewith, means responsive to said unidirectional pulses from one of said first group sets, said last named pulses being indicative of a particular preselected one of said sets, for stepping said armature to one of said terminals corresponding to said last named set, means responsive to said last named means for applying current from said source to said last named terminal by way of said armature, and thence to said last named set, by way of a conducting path including logic relays, means responsive to said multifrequency pulses from one of said second group sets, said last named pulses being indicative of said particular set, for stepping said armature to a non set-designating one of said terminals, and means responsive to said last named means for applying current from said source to said last named terminal by way of said armature, thence to said terminal corresponding to said particular set and thence to said particular set by way of said conducting path, whereby substantially common ringing facilities are utilized whether a call is initiated by one of said first group or by one of said second group sets.

2. In a telephone intercommunication system, in combination, a first group of telephone sets each including means for generating unidirectional pulses corresponding to a dialed digit, a second group of telephone sets each including means for generating multifrequency pulses corresponding to a dialed digit, a multifunction stepping switch including an armature and a plurality of terminals, a network of relays having pairs thereof each operatively responsive to a corresponding one of said multifrequency pulses, means responsive to dial signals from one of said first group sets for actuating said stepping switch thereby to establish a connecting path between a calling and a called one of said sets, means including said relays responsive to dial signals from one of said second group sets for establishing a connection between a calling and a called one of said sets, and means including said stepping switch responsive to dial signals from one of said second group sets for establishing locking paths for operated ones of said relays, whereby said stepping switch is utilized to effect connections in said system whether the calling set is from said first group or from said second group, without, however, any conversion of said multifrequency pulses into corresponding unidirectional pulses.

References Cited by the Examiner

UNITED STATES PATENTS

| | | | |
|---|---|---|---|
| 2,153,129 | 4/1939 | Bascom | 179—18 |
| 2,300,951 | 11/1942 | Malthaner | 179—25 |
| 2,332,912 | 10/1943 | Hecht et al. | 179—84 |
| 2,358,237 | 9/1944 | Lewis et al. | 179—27.02 |
| 2,572,027 | 10/1951 | Horwitz | 179—18.3 |
| 2,959,642 | 11/1960 | Dubuar | 179—18.3 |

STEPHEN W. CAPELLI, *Primary Examiner.*

WALTER L. LYNDE, ROBERT H. ROSE, *Examiners.*

H. BOOHER, H. ZELLER, *Assistant Examiners.*